United States Patent
Maurer et al.

(10) Patent No.: US 7,260,991 B2
(45) Date of Patent: Aug. 28, 2007

(54) ROTATION-RATE SENSOR

(75) Inventors: Dieter Maurer, Pfullingen (DE); Joerg Hauer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/513,907

(22) PCT Filed: Feb. 25, 2003

(86) PCT No.: PCT/DE03/00590

§ 371 (c)(1),
(2), (4) Date: Nov. 8, 2004

(87) PCT Pub. No.: WO2004/020947

PCT Pub. Date: Mar. 11, 2004

(65) Prior Publication Data

US 2005/0223800 A1 Oct. 13, 2005

(30) Foreign Application Priority Data

Aug. 24, 2002 (DE) .............................. 102 38 893

(51) Int. Cl.
*G01P 3/16* (2006.01)
*G01P 15/02* (2006.01)
(52) U.S. Cl. .................. 73/535; 73/504.08; 73/504.12; 73/504.18
(58) Field of Classification Search .................. 73/535
See application file for complete search history.

(56) References Cited

U.S. PATENT DOCUMENTS

| 5,313,835 A | | 5/1994 | Dunn | |
|---|---|---|---|---|
| 5,650,568 A | * | 7/1997 | Greiff et al. | 73/504.09 |
| 5,952,572 A | * | 9/1999 | Yamashita et al. | 73/504.04 |
| 5,955,668 A | * | 9/1999 | Hsu et al. | 73/504.12 |
| 6,776,041 B1 | * | 8/2004 | Hauer et al. | 73/504.09 |

FOREIGN PATENT DOCUMENTS

WO 96 35957 11/1996

* cited by examiner

*Primary Examiner*—Hezron Williams
*Assistant Examiner*—Samir M. Shah
(74) *Attorney, Agent, or Firm*—Kenyon & Kenyon LLP

(57) ABSTRACT

A micromechanical rotation-rate sensor includes a substrate, an anchoring device provided on the substrate, as well as a first spiral spring device and a second spiral spring device, the two spiral spring devices being provided next to one another in mirror symmetry along their greatest extension, and the two spiral spring devices together form one spiral spring apparatus. The sensor further includes a centrifugal mass connected to the anchoring device via the first spiral spring device connected to the centrifugal mass so that the centrifugal mass is elastically deflectable from its neutral position, about a rotational axis situated perpendicularly to a substrate surface, so that the centrifugal mass is capable of rotary oscillation. In addition, the first spiral spring device includes a bend at its anchoring region with the anchoring device.

10 Claims, 3 Drawing Sheets

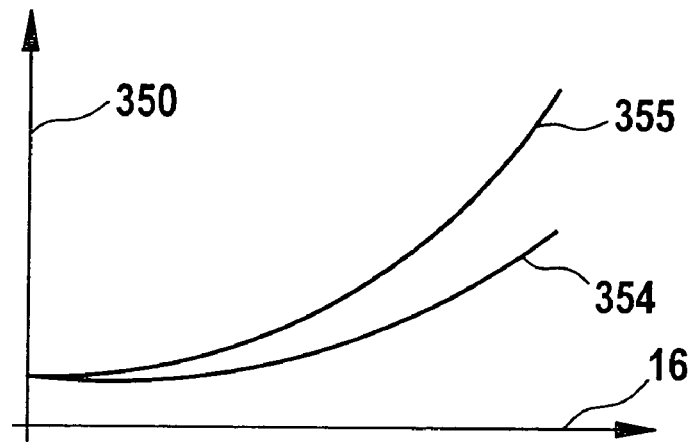
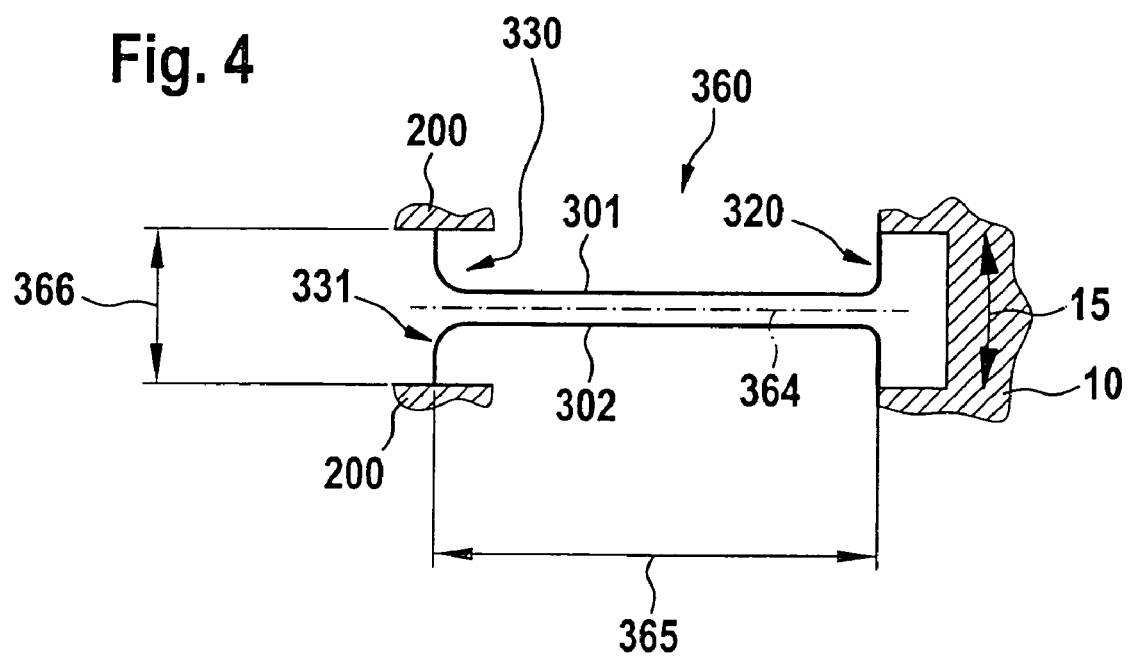

ROTATION-RATE SENSOR

FIELD OF THE INVENTION

The present invention relates to a rotation-rate sensor.

BACKGROUND INFORMATION

A rotation-rate sensor is discussed in German patent document no. 199 45 859. This rotation-rate sensor, however, has a relatively low working frequency.

In the case of the rotation-rate sensor having a rotary oscillator produced using surface micromechanics, the rotary oscillator or the centrifugal mass is mechanically centrally connected to the substrate via an X-shaped spring at one point. A working frequency is established based on the X-shaped spring and the mass of the rotary oscillator. To increase the working frequency with respect to the rotation-rate sensor from the related art, the spring arms of the X-shaped spring would either need to be widened or shortened. Naturally, a combination of the two measures is also conceivable.

However, these measures may result in the problem that the oscillation amplitude would be decreased and the stretching of the spring material would be increased. The decrease in the oscillation amplitude disadvantageously decreases the sensor sensitivity. The increase in the stretching of the X-shaped spring material may result in the spring material breaking. In addition, the non-linearity of the spring stiffness increases over the deflection if the spring length is shortened while the oscillation amplitude remains constant.

For stable sensor operation, the non-linearity is to be kept as minimal as possible since there is otherwise the risk of non-linear collapse (two stable working points).

SUMMARY OF THE INVENTION

In contrast, the rotation-rate sensor of the present invention is believed to have the advantage that the disadvantages of the related art resulting from the measures for increasing the oscillation frequency are prevented.

The spiral spring device of the rotation-rate sensor of the present invention has significantly lower, maximum stretching at the connection for a given deflection. The maximum stretching may also be selected via the size of the radius at the connection. In this context, a large radius signifies minimal stretching at the connection.

It may be particularly advantageous that the spiral spring device is connected to the centrifugal mass such that radial length equalization is achievable. To achieve radial length equalization, it is provided in particular for the spiral spring device to have a bent region at its connection to the centrifugal mass. As a result, the angled end pieces or the bent region may absorb the longitudinal force in the spiral spring devices when rotating the sensor in a plane. If this longitudinal force in the spiral spring device is not reduced, the stiffness increases as a function of the deflection resulting in the non-linearity of the spring stiffness being too great.

The exemplary embodiment and/or exemplary method of the present invention prevents this which is why the radial length equalization also results in a reduction in the non-linearity of the spring stiffness. It is also advantageous for two spiral spring devices to be provided along their greatest extension next to one another in mirror symmetry and together to form one spiral spring. This ensures that a spiral spring for deflections in different directions has a symmetrical characteristic based on its neutral position. For example, the deflection and restoring force during a rotation of the centrifugal mass at an angle about the Z axis in a positive and negative direction are equal. It is also advantageous that two spiral springs are positioned in a V shape such that the legs expand at an opening angle in the direction of the centrifugal mass. Changing the opening angle between the spiral springs allows the detection resonance frequency of the sensor, i.e., the rotation of the centrifugal mass from the substrate level about the X and Y axis to be set.

The relationship of the natural frequencies to one another largely determines the sensor properties, such as sensitivity, immunity to interference, and temperature stability. As a result, via the opening angle of the spiral springs the natural frequencies may be provided so that they are adjustable in a simple, precise, and independent manner. It is also advantageous that a total of four spiral springs are positioned such that they essentially form an X shape. This creates a symmetrical spiral spring shape. It is also advantageous that the opening angle is selected such that the natural frequency is less about the axis of rotation lying perpendicular to the substrate surface than each natural frequency about an axis of rotation lying parallel to the substrate surface. This results in an extraordinarily positive sensing performance. It may also be advantageous that the rotation-rate sensor of the present invention is produced using surface micromechanics or other micromechanic technology.

The use of surface micromechanics for producing the micromechanic rotation-rate sensor of the present invention, in particular a mass production process using a thick EP poly layer with a typical thickness of 10 µm, allows the formation of a stiff sensor structure which enables minimal cross sensitivity. It is additionally advantageous that the anchoring device is fixedly connected to the substrate or that the anchoring device is positioned to be movable relative to the substrate. This renders allows for different applications of the rotation-rate sensor of the present invention. Moreover, it may be advantageous that one or more supporting springs are provided in addition to the spiral springs forming an X shape. This may be advantageously provided according to the exemplary embodiment and/or exemplary method of the present invention to influence other natural frequencies of the sensor in a targeted manner in another embodiment of the sensor.

BRIEF DESCRIPTION OF THE DRAWINGS

FIG. 3 shows a representation of the different linearity characteristics of different spring devices.

FIG. 4 shows a detailed representation of a spiral spring.

DETAILED DESCRIPTION

Figure 1:
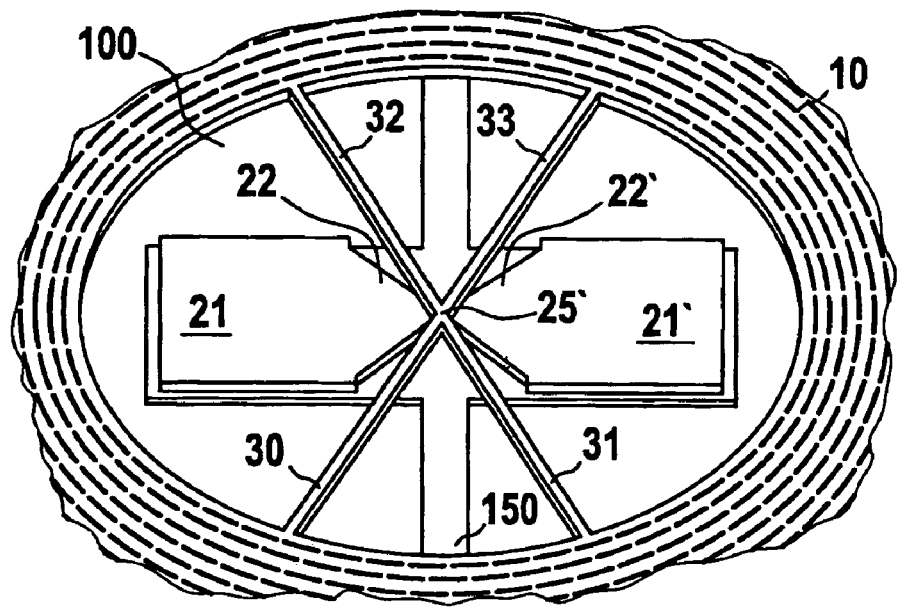
FIG. 1 shows a perspective representation of a rotation-rate sensor according to the related art.

FIG. 1 shows a perspective representation of a conventional rotation-rate sensor according to the related art. In FIG. 1, 100 designates a substrate in the form of a silicon wafer. 10 designates a ring-shaped centrifugal mass, 25' designates a bridge, and 30-33 designate spiral spring legs of two V-shaped spiral springs. 21, 21' designate a base and 150 designates an electrical supply line. Each base 21, 21' has a wedge-shaped taper designated by reference numerals 22, 22' in the direction of bridge 25'. Provided for the conventional rotation-rate sensor shown in FIG. 1 according to the related art is a centrifugal mass 10, which is produced via surface micromechanics, is also designated in the following as rotary oscillator 10, and is mechanically connected in the middle of the system at one point to substrate 100 via an X-shaped spring made of spiral spring legs 30-33. The working frequency of the driven rotary oscillation of the sensor is 1.5 kHz, for example.

The exemplary embodiment and/or exemplary method of the present invention provides for a sensor having a greater working frequency, e.g. greater than 5 kHz. In this context, the structure of centrifugal mass 10 is to remain largely unchanged. For a sensor according to the related art, X-shaped bending legs 30-33 would have to be shortened and/or widened for this purpose. This results in a number of problems. These measures of shortening and/or widening spiral spring legs 30-33 would reduce the sensitivity of the sensor. This is not desirable since sensors having high sensitivity are generally desired. In addition, in the case of a wider spring the stretching at the connection of the X spring, as shown in FIG. 1, becomes so significant that given maximum deflection of the rotary oscillation of centrifugal mass 10, the fatigue limit of the spring material may be reached. This is the case for example when using polysilicon as the spring material. Moreover, in the indicated scenario, the non-linearity of the spring stiffness would increase over the deflection of the X spring if the spring length is shortened while the oscillation amplitude remains the same. However, the non-linearity must be kept as minimal as possible for stable operation of the sensor since there is otherwise the possibility or risk of non-linear collapse. Therefore, the exemplary embodiment and/or exemplary method of the present invention rendered it necessary to find a spring that does not have the abovementioned disadvantages of the related art or only has them to a minimal extent. However, the advantages of the X spring, such as the targeted adjustability of the resonance frequencies about the different oscillation axes, are to be retained.

Figure 2:
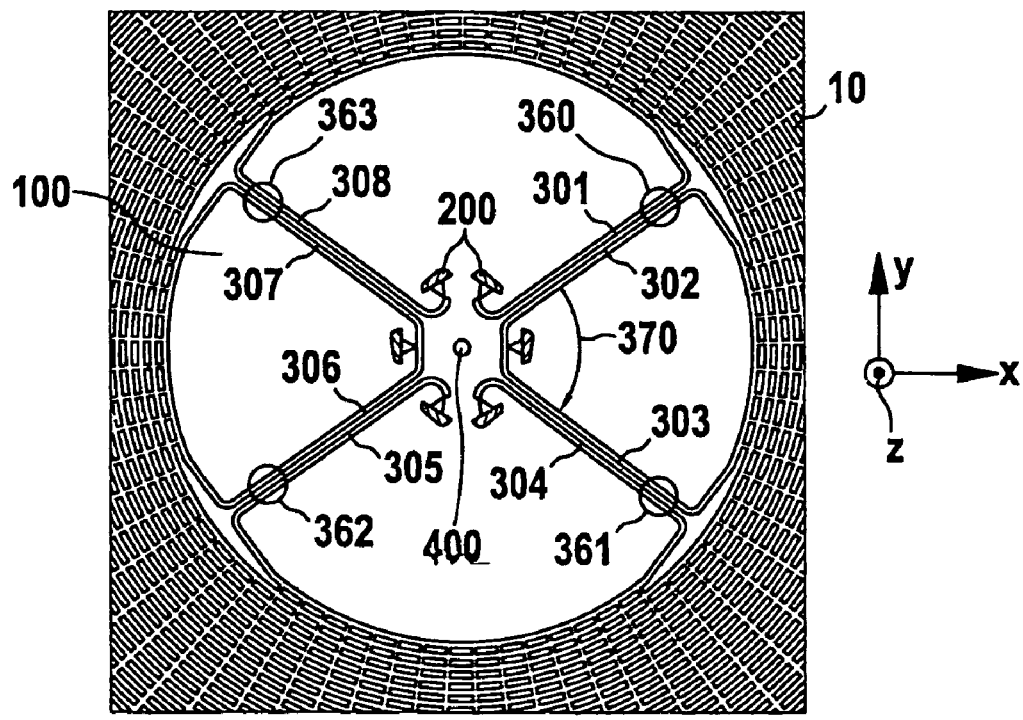
FIG. 2 shows a section of a top view of the center of the sensor system of the present invention.

FIG. 2 shows a section of the sensor center of a rotation-rate sensor of the present invention. The same reference numerals in FIG. 2 designate identical parts or components of the structure. Therefore, 10 designates the centrifugal mass or the rotary oscillator. 100 designates the substrate that is provided according to the invention as a silicon substrate in particular. Anchoring devices 200, which are connected to the one end of a first spiral spring device 301, are also shown in FIG. 2. First spiral spring device 301 is connected at its other end to centrifugal mass 10. A second spiral spring device 302, which also connects anchoring device 200 to centrifugal mass 10, is also provided. Third through eighth spiral spring devices 303-308, which are also provided between anchoring device 200 and centrifugal mass 10, are also provided. Anchoring device 200 is therefore provided in particular such that it provides a different connection position for every spiral spring of devices 301-308. According to the exemplary embodiment and/or exemplary method of the present invention, spiral spring devices 301-308 as well as anchoring device 200 and centrifugal mass 10 are produced in particular from polysilicon over a silicon oxide layer, the silicon oxide layer being subsequently removed in the method via undercutting to structure the movable parts in a deflectable manner with respect to substrate 100. According to the exemplary embodiment and/or exemplary method of the present invention, anchoring device 200 is connected in a special exemplary embodiment via the silicon oxide layer to substrate 100 or is anchored thereto and forms fixed points in the sensor structure. Another exemplary embodiment of the present invention provides for spiral spring devices 301-308 to be connected to a movable anchoring device 200 so that anchoring device 200 is not rigidly connected to substrate 100 in this case. However, the exemplary embodiment and/or exemplary method of the present invention is subsequently described on the basis of an exemplary embodiment in which anchoring device 200 is fixedly connected to substrate 100.

According to the exemplary embodiment and/or exemplary method of the present invention, spiral spring devices 301-308 are positioned in particular such that first spiral spring device 301 and second spiral spring device 202 are positioned symmetrically, specifically in mirror symmetry, along an axis not shown in FIG. 2 and together form a first spiral spring 360. Third and fourth spiral spring devices 303 and 304 also form a second spiral spring 361 in a corresponding manner. Together fifth and sixth spiral spring devices 305, 306 also form a third spiral spring 362, and seventh and eighth spiral spring devices 307, 308 together form a fourth spiral spring 363.

As previously described, the exemplary embodiment and/ or exemplary method of the present invention provides for centrifugal mass 10 to be provided in a ring shape in particular which is centered around a center 400. In this context, substrate 100 forms a main substrate level on which centrifugal mass 100 mainly extends. The two directions X and Y shown in the right portion of FIG. 2 lie on the main substrate level, the X direction pointing horizontally from left to right in the plane of projection and the Y direction pointing from bottom to top in the plane of projection. The Z direction is provided perpendicular to the plane of projection and to the main substrate level and points out from the plane of projection toward the viewer. Center 400 is the center of the rotary oscillation of centrifugal mass 10 about an axis running in the Z direction and cutting substrate 100 in center 400. Together first spiral spring 360 and second spiral spring 361 essentially form two legs which are positioned in a V shape such that the legs expand toward centrifugal mass 10 at an opening angle designated by reference numeral 370. Third and fourth spiral springs 362, 363 also form legs positioned in a V shape and are positioned according to the exemplary embodiment and/or exemplary method of the present invention particularly at an identical opening angle 370 in mirror symmetry to first and second spiral springs 360, 361 so that the four spiral springs 360-363 together essentially have an X-shaped configuration.

FIG. 3 shows a representation of the linearity properties of an imaginary first spring device 354 and an imaginary second spring device 355. FIG. 3 shows the diagram of stiffness 350 of spring device 354, 355 over amplitude 16. For the example of a spiral spring as spring device 354, 355, the oscillation amplitude or deflection 16 in FIG. 3 corresponds for example to the deflection of a free end of a clamped spiral spring in comparison with its neutral position. In the case of otherwise equal dimensions, a shorter length of the spiral spring and first spring device 354 would correspond to a greater length of the spiral spring in the example shown of second spring device 355 if the same material is used. Therefore, in the case of a deflection 16 not equaling zero, stiffness 350 is greater for the shorter spring length of second spring device 355 than for the greater spring length of first spring device 354. As a result, a greater non-linear proportion is to be taken into consideration for second spring device 355 given same oscillation amplitude 16. This is to be avoided in the production of a rotation-rate sensor so that the non-linear proportion is kept as minimal as possible.

FIG. 4 shows a detailed and enlarged representation of first spiral spring 360. Shown on the left side of FIG. 4 is anchoring device 200, to which a first end 330 of first spiral spring device 301 is connected. This is connected at a second end 320 of first spiral spring device 301 to centrifugal mass 10. In the embodiment of rotary oscillations of centrifugal mass 10 about center 400, which is however not shown in FIG. 4, a movement shown by a double arrow results, the double arrow being provided with reference numeral 15. The greater the distance covered by centrifugal mass 10 during movement 15 is, the greater the oscillation amplitude shown by reference numeral 16 in FIG. 3. In addition to first spiral spring device 301, first spiral spring 360 includes second spiral spring device 302, first and second spiral spring device 301, 302 being situated in mirror symmetry with respect to one another along the plane of symmetry designated in FIG. 4 by reference numeral 364. Second spiral spring device 302 also has a first and a second end, but these are not designated by an individual reference numeral in FIG. 4. In the region of first end 330, first spiral spring device 301 has a bend, the radius of which is designated by reference numeral 331 in the example of second spiral spring device 302. This results in the maximum stretching at the connection position of first spiral spring device 301 to anchoring device 200 being significantly less during deflection of first spiral spring device 301 than in the case of the conventional rotation-rate sensor according to the related art. Moreover, the maximum stretching at the connection of anchoring device 200 may be varied via the size of radius 331. In this context, a large radius 331 means that less stretching occurs at the connection given otherwise identical conditions and in particular identical oscillation amplitudes. The provision of in each case two spiral spring devices to form a spiral spring results in the same stiffness of spiral spring 360 as in the case of a spring having a significantly wider, one-piece configuration. An angled or bent region is provided in the region of second end 320 of first spiral spring device 301 as shown in FIG. 4. This angled region or these angled end pieces in the region of second end 320 of spiral spring device 301 allow for a longitudinal force to be absorbed during a rotation of centrifugal mass 10 in the XY plane of spiral spring device 301. If this longitudinal force in first spiral spring device 301 was not absorbed by the bent region, the stiffness would increase significantly over the deflection, thereby increasing the non-linearity of the spring stiffness. This is prevented by the bend at second end 320 of first spiral spring device 301. As a result, a spiral spring 360 may be formed, which is provided for greater working frequencies of the sensor and therefore has the same properties as a spring having a greater spring width or a shorter spring length than the X spring shown in FIG. 1 according to the conventional sensor. The total simulated greater spring width due to the double configuration of every spiral spring device 301-308 and the consequently greater spring stiffness also result in the additional advantage that when producing such a structure of the exemplary embodiment of the present invention in which production fluctuations occur in the spring width, the relative variance in spring width from sensor to sensor and consequently in the resonance frequency of centrifugal mass 10 becomes relatively smaller because there is a greater absolute spring width for the same width fluctuation in production, and therefore the relative fluctuation in resonance frequency is smaller.

According to the exemplary embodiment and/or exemplary method of the present invention, the bent region in first spiral spring device 301 at second end 320 of first spiral spring device 301 and bend 331 at first end 330 of first spiral spring device 301 are provided in the XY plane in particular, i.e., in the main substrate level, in the same direction of axis of affinity 364. This results in a U shape of spiral spring devices 301-308. The exemplary embodiment and/or exemplary method of the present invention provides for the length of first spiral spring device 301 designated by reference numeral 365 in FIG. 4 to be significantly greater than width 366 of a spiral spring 360. As a result of a large connection radius 331 in the region of first end 330 of first spiral spring device 301, the mechanical strain from the oscillation at the connection point to anchoring device 200 is able to be reduced.

A suspension point of a spiral spring device 301-308 at anchoring device 200 is not necessarily required to be connected to substrate 100. Spiral spring device 301-308 may also be located between two masses moving relative to one another, for example.

Figure 5:
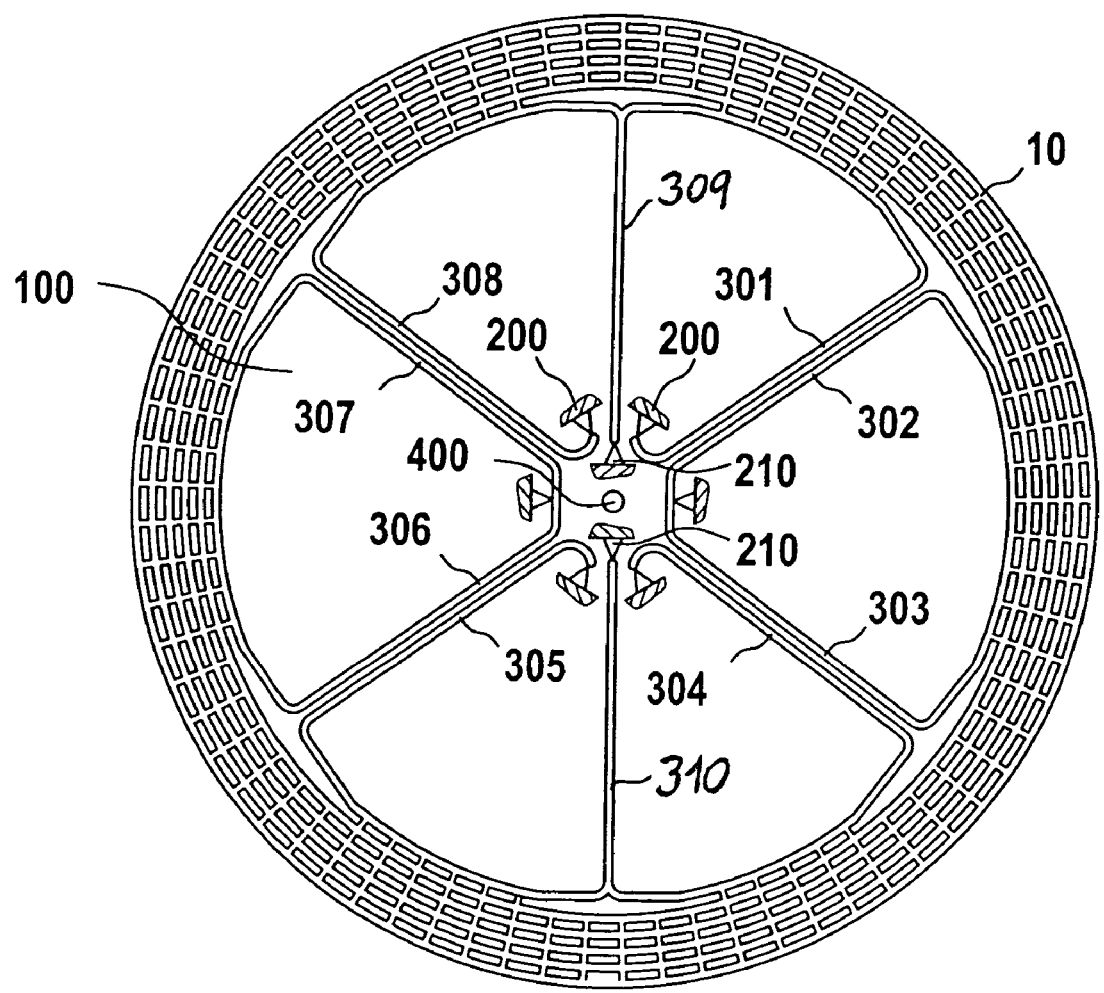
FIG. 5 shows a further embodiment of the rotation-rate sensor of the present invention.

In addition to the X-shaped configuration of spiral springs 360-363 described in FIG. 2, other spring elements may also be integrated. This is shown in FIG. 5. FIG. 5 shows essentially the same configuration with respect to centrifugal mass 10, substrate 100, spiral spring devices 301-308, and anchoring device 200 as in FIG. 2. However, a further anchoring device 210 is provided to which a first support spring 309 or a second support spring 310 is connected, support springs 309, 310 being connected to centrifugal mass 10. First support spring 309 is provided opposite second support spring 310 with respect to center 400 of the sensor configuration. Additional anchoring device 210 for anchoring support springs 309, 310 is provided in the immediate vicinity of anchoring device 200 near center 400. According to the exemplary embodiment and/or exemplary method of the present invention, support springs 309, 310 are used in particular for targeted influencing of specific natural frequencies of the sensor that are not or only insufficiently influenceable by spiral springs 360, 363.

What is claimed:
1. A micromechanical rotation-rate sensor comprising:
a substrate;
an anchoring device provided on the substrate;
a first spiral spring device and a second spiral spring device, wherein the two spiral spring devices are provided next to one another in mirror symmetry along their greatest extension, and wherein the two spiral spring devices together form one spiral spring apparatus; and
a centrifugal mass connected to the anchoring device via the first and second spiral spring devices connected to the centrifugal mass so that the centrifugal mass is elastically deflectable from its neutral position, about a rotational axis situated perpendicularly to a substrate surface and so that it is capable of rotary oscillation;
wherein the first spiral spring device includes a first bend at its anchoring region with the anchoring device, the second spiral spring device includes a second bend at its anchoring region with the anchoring device, the first bend bending away from the first and second spiral spring devices towards a first portion of the anchoring region, the second bend bending away from the first and second spiral spring devices towards a second portion of the anchoring region.

2. The rotation-rate sensor of claim 1, wherein the bend at the anchoring region of the first spiral spring device is configured to enable radial length equalization.

3. The rotation-rate sensor of claim 1, wherein the first spiral spring device includes a bent region at its connection to the centrifugal mass.

4. The rotation-rate sensor of claim 1, wherein the anchoring region of the first spiral spring device is provided outside a center of the rotary oscillation.

5. The rotation-rate sensor of claim 1, further comprising:
a third spiral spring device connecting the centrifugal mass to the anchoring device;
wherein the first and third spiral spring devices are positioned in a V shape such that legs of the V shape spread open in a direction of the centrifugal mass at an opening angle.

6. The rotation-rate sensor of claim 5, wherein the opening angle is selected such that a natural frequency of the rotation-rate sensor is less about the axis of rotation situated perpendicularly to the substrate surface than each natural frequency of the rotation rate sensor about an axis of rotation situated in parallel to the substrate surface.

7. The rotation-rate sensor of claim 1, further comprising:
three additional spiral spring devices, wherein the first and the three additional spiral spring devices are positioned such that they essentially form an X shape.

8. The rotation-rate sensor of claim 7, further comprising:
at least one spring device in addition to the spiral spring devices forming an X shape, the additional spring device connecting the centrifugal mass to the anchoring device.

9. The rotation-rate sensor of claim 1, wherein the rotation-rate sensor is produced using one of a silicon surface micromechanics process and another micromechanics process.

10. The rotation-rate sensor of claim 1, wherein at least one of:
the anchoring device is fixedly connected to the substrate, or the anchoring device is positioned in a movable manner relative to the substrate.

* * * * *